(12) United States Patent
Pehlert et al.

(10) Patent No.: US 11,104,783 B2
(45) Date of Patent: Aug. 31, 2021

(54) POLYPROPYLENE FOR FILMS AND THE FILMS THEREFROM

(71) Applicant: ExxonMobil Chemical Patents Inc., Baytown, TX (US)

(72) Inventors: George J. Pehlert, Houston, TX (US); Stefan B. Ohlsson, Keerbergen (BE); Edward F. Allen, Jr., Houston, TX (US); Juliet B. Wagner, Houston, TX (US); Edward Y. Bylina, Baton Rouge, LA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 437 days.

(21) Appl. No.: 15/766,511

(22) PCT Filed: Sep. 16, 2016

(86) PCT No.: PCT/US2016/052115
§ 371 (c)(1),
(2) Date: Apr. 6, 2018

(87) PCT Pub. No.: WO2017/095501
PCT Pub. Date: Jun. 8, 2017

(65) Prior Publication Data
US 2018/0298173 A1    Oct. 18, 2018

Related U.S. Application Data

(60) Provisional application No. 62/260,969, filed on Nov. 30, 2015.

(30) Foreign Application Priority Data

Feb. 2, 2016  (EP) ..................... 16153731

(51) Int. Cl.
C08L 23/12        (2006.01)
C08F 110/06       (2006.01)
C08L 23/10        (2006.01)

(52) U.S. Cl.
CPC ............ C08L 23/12 (2013.01); C08F 110/06 (2013.01); C08L 23/10 (2013.01); *C08F 2500/01* (2013.01); *C08F 2500/04* (2013.01); *C08F 2500/11* (2013.01); *C08L 2203/16* (2013.01); *C08L 2205/025* (2013.01)

(58) Field of Classification Search
CPC ...... C08L 23/12; C08L 23/10; C08L 2203/16; C08L 2205/025; C08F 110/06; C08F 2500/01; C08F 2500/04; B32B 27/08; B32B 27/32

USPC .......................................................... 526/351
See application file for complete search history.

(56) References Cited

U.S. PATENT DOCUMENTS

| 5,368,919 A | 11/1994 | Robeson |
|---|---|---|
| 2010/0087602 A1 | 4/2010 | Li et al. |
| 2011/0003940 A1 | 1/2011 | Karjala et al. |
| 2011/0200775 A1 | 8/2011 | Bernreitner et al. |
| 2012/0270039 A1 | 10/2012 | Tynys et al. |
| 2013/0123431 A1 | 5/2013 | Filipe et al. |
| 2015/0175789 A1 | 6/2015 | Klimke et al. |
| 2015/0252127 A1 | 9/2015 | Meka et al. |
| 2020/0325290 A1 | 10/2020 | Schmitt et al. |

FOREIGN PATENT DOCUMENTS

| EP | 2 338 930 A | 6/2011 | |
|---|---|---|---|
| EP | 2 338 931 A | 6/2011 | |
| EP | 2 492 293 B | 9/2017 | |
| WO | 2008/148693 | 12/2008 | |
| WO | 2012/020106 A | 2/2012 | |
| WO | 2012/049690 A | 4/2012 | |
| WO | 2014/070385 A | 5/2014 | |
| WO | WO 2014/070384 A1 | 5/2014 | |
| WO | WO-2014070385 A1 * | 5/2014 | ............ B32B 27/08 |
| WO | 2014/088856 | 6/2014 | |

OTHER PUBLICATIONS

U.S. Appl. No. 62/504,044, filed May 10, 2017 entitled "Polymer Compositions Comprising Broad Molecular Weight Distribution Polypropylene and Articles Therefrom".

* cited by examiner

*Primary Examiner* — Ling Siu Choi
*Assistant Examiner* — Ronald Grinsted

(57) ABSTRACT

A process to prepare a polypropylene, and the polypropylene and films therefrom, comprising combining a high melt strength polypropylene comprising at least 50 mol % propylene, and having a molecular weight distribution (Mw/Mn) greater than 6, a branching index ($g'_{vis}$) of at least 0.95, and a melt strength of at least 20 cN determined using an extensional rheometer at 190° C., and within the range from 20 to 1000 ppm of a long half-life organic peroxide, and isolating the polypropylene, wherein the polypropylene thus formed has a molecular weight distribution (Mw/Mn) within a range of from 7 to 22, a z-average molecular weight of less than 1,600,000 g/mole, a branching index ($g'_{vis}$) of at least 0.95; and a melt strength less than 20 cN.

12 Claims, 3 Drawing Sheets

POLYPROPYLENE FOR FILMS AND THE FILMS THEREFROM

CROSS-REFERENCE TO RELATED APPLICATIONS

This application is a National Phase Application claiming priority to PCT Application Serial No. PCT/US2016/052115 filed Sep. 16, 2016, and claims the benefit of U.S. provisional application Ser. No. 62/260,969 filed Nov. 30, 2015, and EP Application No. 16153731.1 filed Feb. 2, 2016, the disclosures of which are fully incorporated by reference in their entirety.

FIELD OF THE INVENTION

The present invention relates to high melt strength polypropylenes that are modified to be suitable for films, and in particular to multi-layered films incorporating at least one layer comprising a high melt strength polypropylene having desirable properties.

BACKGROUND

The film making and extrusion process requires polymers with good processability to achieve commercial throughput rates, sufficient melt strength to maintain, for example, bubble stability in making blown films, and good physical properties (e.g. stiffness, toughness, tear, etc.). Based on the balance of properties, certain high melt strength polypropylenes (HMS PP's) appeared to be good candidates for blown film applications when they demonstrated a broad molecular weight distribution (Mw/Mn, or "MWD") that helps provide shear thinning as well as the presence of the high molecular weight tail that helps to provide sufficient melt strength and high stiffness. However, it was found that during the blown film process that polypropylenes having this high molecular weight tail, while having good melt strength and shear thinning, exhibited surface and bulk irregularities (a wrinkly appearance, melt fracture, etc.) even when processed at low shear rates (below a commercial range of 13 lb/hr/in). What is needed is an improved polypropylene having a desirable melt strength, but not so high that it creates other problems, and in particular a method of tailoring the amount of the high molecular weight component is needed.

Related publications include WO 2014/070385; WO 2014/088856; WO 2012/049690; WO 2012/020106; EP 2 492 293 A1; EP 2 338 931 A1; EP 2 338 930 A1; US 2012/0270039; US 2011/0200775; and US 2010/087602.

SUMMARY

Disclosed herein is a process to prepare a polypropylene ("tPP") comprising combining a high melt strength polypropylene comprising at least 50 mol % propylene, and having a molecular weight distribution (Mw/Mn) greater than 6, a branching index ($g'_{vis}$) of at least 0.95, and a melt strength of at least 20 cN determined using an extensional rheometer at 190° C., with within the range from 20 to 1000 ppm of a long half-life organic peroxide; and/or within the range from 20 to 70 wt % of a narrow MWD polypropylene comprising at least 50 mol % propylene, and having a molecular weight distribution (Mw/Mn) of less than 6; isolating a trimmed polypropylene.

Also disclosed are polypropylenes comprising at least 50 mol % propylene and having a molecular weight distribution (Mw/Mn) of less than 22, or 20, or 18, or 16, or 15, or within a range from 5, or 6, or 7, or 7.5, or 8, or 8.5, or 9 to 15, or 16, or 18, or 20, or 22; a z-average molecular weight of less than 2,500,000 g/mole, or 2,000,000 g/mole, 1,600,000 g/mole, or 1,400,000 g/mole, or 1,200,000 g/mole, or within a range from 500,000, or 600,000, or 800,000 g/mole to 1,200,000, or 1,400,000, or 1,600,000 g/mole; a branching index ($g'_{vis}$) of at least 0.95; and a melt strength less than 20 cN determined using an extensional rheometer at 190° C.

DETAILED DESCRIPTION

Figure 1:
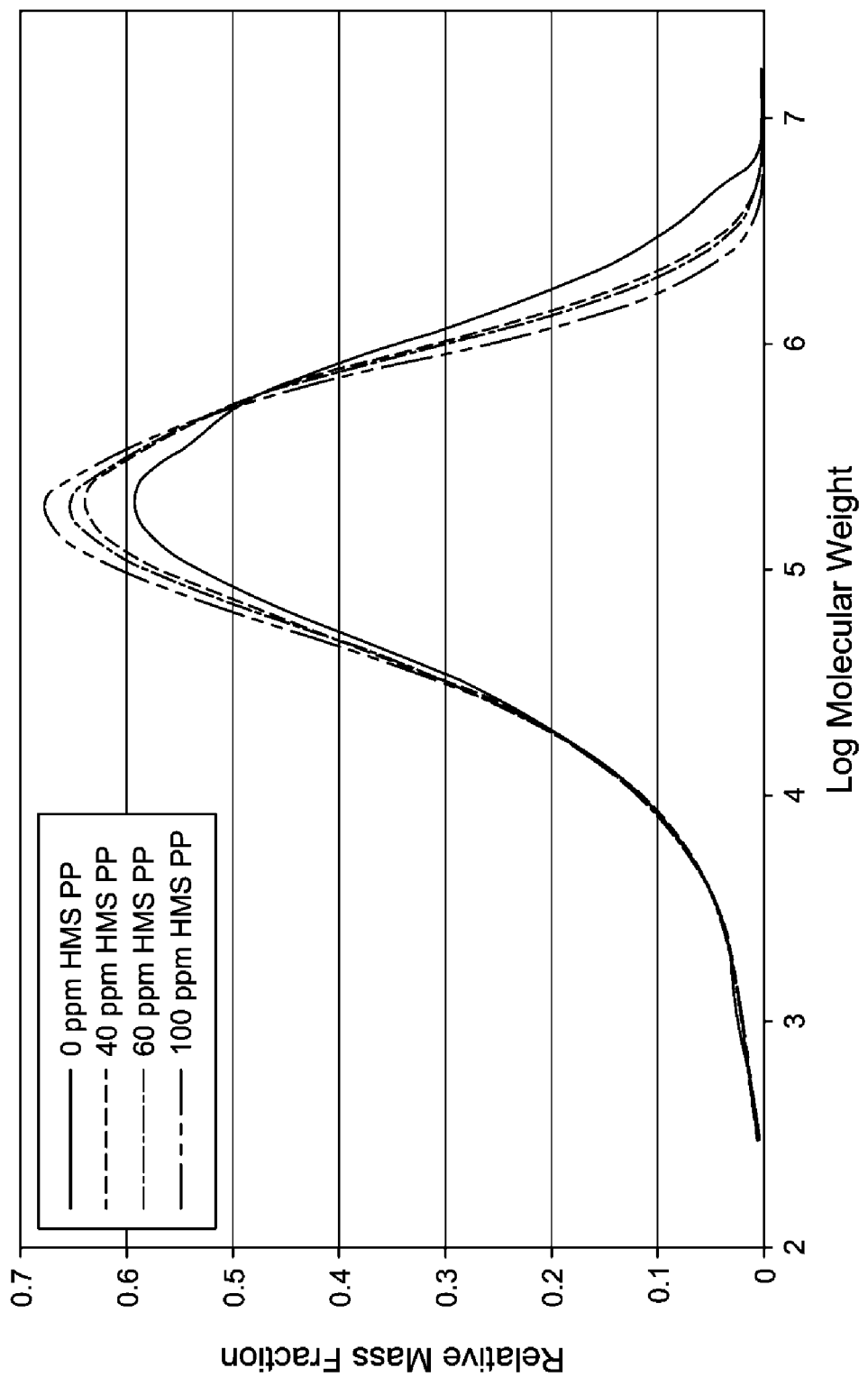
FIG. 1 shows overlay Size Exclusion Chromatograph ("SEC") chromatograms of exemplary high melt strength PP that has been "trimmed" using a long half-life peroxide to reduce the high molecular weight tail.

By diluting the concentration of the high molecular weight chains in polymers such as HMS PP having a high molecular weight component or "tail," such as by blending the HMS PP with a narrow MWD homopolymer PP, it was found that the film quality improved without the appearance of the film surface/bulk irregularity at commercial rates of at least 13 lb/hr/in. It was also found that the concentration of high molecular weight tail could be reduced by addition of low levels of peroxides that have relatively "long" half-lives (e.g., Luperox™ 101, Triganox™ 101). Using this approach, the film quality of HMS PP improved without surface/bulk irregularity at the commercial rates of at least 13 lb/hr/in.

As used herein, the terms "trim," "trimmed," and "trimming" refer to the reduction, either chemically or by dilution, of the high molecular weight tail of a polymer, which is manifest by a reduction of the z-average molecular weight of the polymer, independently and relative to the number average and weight average molecular weight. Preferably, the terms refer to chemical reduction.

As used herein a "film" or "multi-layered film" is a material that has an average thickness of less than or equal to 0.25 mm and may include one or more substances such as polymers, fillers, oils, antioxidants, antistatic agents, anti-blocking agents, etc., and preferably is continuous within its measurable width and length, typically is flexible, and most preferably has a thickness within a range from 2 or 10 or 20 or 40 μm to 50 or 100 or 150 or 200 or 250 μm. The term "film" also includes the possibility of coatings, such as when the film is extruded onto a surface such as a metal, glass, another polymer, or other stiff or flexible surface.

Trimming of a HMS PP can occur by either chemical treatment with a long half-life organic peroxide, by physical dilution with a narrow molecular weight distribution (MWD) polypropylene, or a combination of the two. In any embodiment, the HMS PP's described herein are trimmed only by treatment with a long-half-life organic peroxide. Thus, in any embodiment the invention includes a process to prepare a trimmed polypropylene (tPP) comprising combining a high melt strength polypropylene (HMS PP) comprising at least 50 mol % propylene, and having a molecular weight distribution (Mw/Mn) greater than 6, a branching index ($g'_{vis}$) of at least 0.95, and a melt strength of at least 20 cN determined using an extensional rheometer at 190° C., with (i) within the range from 20 to 1000 ppm of a long half-life organic peroxide; and/or (ii) within the range from 20 to 70 wt % of a narrow MWD polypropylene comprising at least 50 mol % propylene, and having a molecular weight distribution (Mw/Mn) of less than 6, and isolating a trimmed polypropylene. Other properties of the starting HMS PP, and the tPP will be described below.

Also in any embodiment the invention is the tPP comprising at least 50 mol % propylene and having a molecular weight distribution (Mw/Mn) of less than 22, or 20, or 18, or 16, or 15, or within a range from 5, or 6, or 7, or 7.5, or 8, or 8.5, or 9 to 15, or 16, or 18; or 20, or 22, a z-average molecular weight of less than 2,500,000 g/mole, or 2,000,000 g/mole, or 1,600,000 g/mole, or 1,400,000 g/mole, or 1,200,000 g/mole, or within a range from 500,000, or 600,000, or 800,000 g/mole to 1,200,000, or 1,400,000, or 1,600,000 g/mole; a branching index ($g'_{vis}$) of at least 0.95; and a melt strength less than 20 cN determined using an extensional rheometer at 190° C. Other properties of the tPP will be described below.

High Melt Strength Polypropylenes (HMS PP)

The inventive trimmed polypropylenes (tPP), and films (or coatings) therefrom, derive from a polypropylene having a relatively high Melt Strength (greater than 15, or 20 cN), referred to herein simply as a "high melt strength polypropylene" (or HMS PP) having certain desirable features as described here, made according to the disclosure in WO 2014/070386. In particular, in any embodiment the HMS PP useful in the present inventions comprises at least 50, or 60, or 70, or 80, or 90 mol % propylene-derived monomer units, or within a range from 50, or 60, or 80 to 95, or 99 mol % propylene-derived units, the remainder of the monomer units selected from the group consisting of ethylene and $C_4$ to $C_{20}$ α-olefins, preferably ethylene or 1-butene. In any embodiment the HMS PP is a homopolymer of propylene-derived monomer units.

In any embodiment the HMS PP has an isopentad percentage of greater than 90, or 92, or 95%. Also in any embodiment the HMS PP has a melt flow rate (MFR) within the range from 0.1 or 1 or 2 g/10 min to 12 or 16 or 20 or 40 g/10 min, determined according to ASTM D1238 Condition L (230° C./2.16 kg).

In any embodiment, the HMS PP has a weight average molecular weight (Mw) within the range from 200,000, or 300,000, or 350,000 g/mole to 500,000, or 600,000, or 700,000 g/mole; a number average molecular weight (Mn) within the range from 15,000, or 20,000 g/mole to 30,000, or 35,000, or 40,000 g/mole; and a z-average molecular weight within a range from 900,000, or 1,000,000, or 1,200,000 g/mole to 1,800,000, or 2,000,000, or 2,200,000 g/mole, as measured by SEC described herein. In any embodiment the HMS PP has a molecular weight distribution (Mw/Mn) of greater than 6 or 7 or 8; or within a range from 6 or 7 or 8 or 10, or 12 to 14 or 16 or 18 or 20 or 24. Also in any embodiment the HMS PP has an Mz/Mw of greater than 3.0, or 3.4, or 3.6, or within a range from 3.0, or 3.4, or 3.6 to 3.8, or 4.0, or 4.4. Finally, in any embodiment the HMS PP has a Mz/Mn of greater than 35, or 40, or 55, or 60, or within a range from 35, or 40, or 55 to 60, or 65, or 70, or 75, or 80.

The HMS PPs useful in the present invention tend to be linear as evidenced by a high branching index. Thus, in any embodiment the HMS PPs have a branching index (g', also referred to in the literature as $g'_{vis\ avg}$) of at least 0.95, or 0.97 or 0.98, as determined in column 37 of U.S. Pat. No. 7,807,769 determined by using a High Temperature Size Exclusion Chromatograph (either from Waters Corporation or Polymer Laboratories), equipped with three in-line detectors, a differential refractive index detector (DRI), a light scattering (LS) detector, and a viscometer.

In any embodiment the HMS PPs useful herein have a melt strength of at least 15 or 20 cN determined using an extensional rheometer at 190° C.; or within a range from 10 or 15 or 20 cN to 35 or 40 or 60 or 80 or 100 cN.

In any embodiment the HMS PPs have a viscosity ratio within the range from 35 to 80 determined from the complex viscosity ratio at 0.01 to 100 rad/s angular frequency at a fixed strain of 10% at 190° C. Also in any embodiment the HMS PP has a Peak Extensional Viscosity (annealed) within a range from 10, or 20 kPa·s to 40 or 50 or 55 or 60 or 80 or 100 kPa·s at a strain rate of 0.01/sec (190° C.).

In any embodiment the HMS PP has a heat distortion temperature of greater than or equal to 100° C., determined according to ASTM D648 using a load of 0.45 MPa (66 psi). Finally, in any embodiment the HMS PP has a Modulus within the range from 1800 or 2000 MPa to 2400 or 2500 MPa determined according to ASTM D790A on nucleated samples with 0.01 to 0.1 wt % α-nucleating agent.

Finally, in any embodiment the HMS PPs have a peak melting point temperature (second melt, $Tm_2$) of greater than 160, or 164° C., or within a range from 160, or 164° C. to 168, or 170° C. (by DSC); and a crystallization temperature (Tc) of greater than 100, or 105, or 110° C., or within a range from 100, or 105, or 110° C. to 115, or 120° C. (by DSC).

In any embodiment, the HMS PPs used to make the tPP's and films therefrom is a reactor-grade material, meaning that it is used as it comes out of the reactor used to produce it, optionally having been further made into pellets of material that has not altered any of its properties such as the branching index, MWD, melt flow rate, etc., by more than 1% of its original value. In any embodiment, the HMS PP has not been cross-linked or reacted with any radiation or chemical substance to cause cross-linking and/or long-chain branching. Typical forms of radiation known to cause cross-linking and/or long-chain branching include use of so-called e-beams or other radiation (beta or gamma rays) that interact with the polymer.

Process to form the Trimmed Polypropylene

As stated above, the process to prepare the tPP comprising combining the HMS PP with either a long half-life organic peroxide, a narrow MWD polypropylene, or a combination thereof. Preferably the long half-life organic peroxide is combined with the HMS PP such that it is within the range from 20, or 25, or 50 ppm to 400, or 600, or 800, or 1000 ppm of a long half-life organic peroxide based on the weight of the peroxide, the HMS PP, and any other additives. By "long half-life organic peroxide," what is meant is an organic peroxide (a peroxide-containing hydrocarbon) having a 1 hour half-life temperature ($^1t_{1/2}$) of greater than 100, or 110, or 120, or 130° C., as measured in C6 to C16 alkane such as dodecane or decane, or a halogenated aryl compound such as chlorobenzene.

Desirably, such peroxides include those having the general structure $R^1$—OO—$R^2$, or $R^1$—OO—$R^3$—OO—$R^2$, or, more generally, $(R^1$—OO—$R^2)_n$, where "n" is an integer from 1 to 5; and wherein each of $R^1$ and $R^2$ are independently selected from C2 to C10 alkyls, C6 to C12 aryls, and C7 to C16 alkylaryls, preferably iso- or tertiary-alkyls, and $R^3$ is selected from C1 to C6, or C10 alkylenes, C6 to C12 aryls, and C7 to C16 alkylaryls; the "—OO—" being the peroxide moiety. Specific examples of desirable long half-life organic peroxides include 2,5-dimethyl-2,5-di(tert-butylperoxy)hexane, 2,5-Bis(tert-butylperoxy)-2,5-dimethylhexane, di-tertbutyl peroxide, and dicumyl peroxide.

The half-life is determined by differential scanning calorimetry-thermal activity monitoring of a dilute solution of the initiator in the desired solvent. The half-life can then be calculated from the Arrhenius plot as is well known in the art. Thus, by treating the HMS PP, having a large amount of a high molecular weight component or "tail", with the long half-life peroxide the high molecular weight component is reduced or "trimmed". The appropriate solvent is determined based on the solubility of the organic peroxide.

Alternatively, or additionally, the HMS PP can be trimmed by combining within the range from 20, or 30 wt % to 50, or 60, or 70 wt %, by weight of the combined components, of a "narrow MWD polypropylene" comprising at least 50 mol % propylene, the "narrow MWD polypropylene" having an MWD of less than 6, or 5, or 4, or within a range from 2, or 2.5 to 4, or 5, or 6. In any embodiment the MFR of the narrow MWD polypropylene is within a range from 4, or 8 g/10 min to 40, or 60, or 80, or 100 g/10 min. The narrow MWD polypropylene can be most any type of propylene polymer having at least 50 mol % propylene-derived units, such as those comprising from 0.1 to 5 wt % comonomers such as ethylene-derived units, and is preferably homopolymers of propylene, and most preferably isotactic polypropylenes. Thus, the high molecular weight component of the HMS PP can be diluted or "trimmed" using this technique. The "trimming" includes combining the HMS PP and narrow MWD polypropylene by melt blending as is known in the art, preferably through one or two passes through an extruder, such as described in the "two-pass" process of PCT/US2015/043575 filed Aug. 4, 2015.

In any embodiment, the "combining" of the HMS PP and the long half-life organic peroxide is performed by melt blending at least the peroxide and HMS PP at the melting temperature of the HMS PP, preferably at a temperature of at least 120, or 130, or 150, or 160° C., and most preferably takes place at a temperature within the range from 120, or 130, or 140, or 150, or 160° C. to 220° C., or 240, or 260, or 280, or 300° C., such temperature being the melt temperature as measured by a thermocouple in the melt upon extrusion from the mixing apparatus used to combine the materials. Most preferably the melt temperature of any melt including the HMS PP is within a range from 245, or 250° C. to 260° C. At such temperatures the long half-time organic peroxides are activated towards beta-scissioning of the polypropylene and at the low concentrations used achieve the desired trimming, the amount and combining temperature being tailored to the desired level of trimming for the particular HMS PP. Preferably the combining takes place in a single-screw or twin-screw extruder, preferably having controlled heating capability. This process can take place to form pellets of tPP, or in-line with the film making equipment or other desirable end-use making equipment such as thermoforming, blow molding, etc.

The Trimmed Polypropylene (tPP)

The process of combining the long half-life organic peroxide with the HMS PP leads to the inventive tPP's. The starting polypropylenes used to make the tPP's typically have a large amount of high molecular weight polymer chains, typically above the critical orientation level. When making certain articles such as films, this can lead to strong films, but with many surface defects and thus unusable for most applications. It has been surprisingly found that if some of the high molecular weight component is reduced or removed—trimmed—the resulting tPP has certain desirable properties, but maintains other desirable properties.

Thus in any embodiment, the melt strength (measured at 190° C. as described herein) of the inventive tPP's is less than 20, or 15, or 10 cN, or within a range from 1, or 2 cN to 4, or 6, or 10, or 15, or 20 cN. Also, in any embodiment the crystallization temperature Tc (as measured by DSC) of the tPP is greater than 114, or 115, or 116° C.; or within a range from 114, or 115, or 116° C. to 120° C., or 122, or 124° C. And in any embodiment the second peak melting temperature $Tm_2$ (as measured by DSC) of the tPP is greater than 157, or 158, or 159° C., or within a range from 157, or 158, or 159° C. to 166° C., or 167, or 168, or 169° C.

In any embodiment, the inventive tPP's have a branching index (g', also referred to in the literature as $g'_{vis\ avg}$) of at least 0.95, or 0.97 or 0.98.

As mentioned, the tPP's have molecular weight features distinct from the HMS PP from which they are derived. In any embodiment the z-average molecular weight of the tPP is less than 2,500,000 g/mole, or 2,000,000 g/mole, or 1,600,000 g/mole, or 1,400,000 g/mole, or 1,200,000 g/mole, or within a range from 500,000, or 600,000, or 800,000 g/mole to 1,200,000, or 1,400,000, or 1,600,000, or 2,000,000, or 2,500,000 g/mole. Also in any embodiment the Mz/Mn value of the tPP is less than 60, or 55, or 40, or within a range from 10, or 15, or 20, or 25 to 35, or 40, or 55, or 60. And in any embodiment the Mz/Mw value of the tPP is less than 4.0, or 3.8, or 3.6, or within a range from 2.5, or 2.6 to 3.6, or 3.8, or 4.0. And in any embodiment, the tPP's have a molecular weight distribution (Mw/Mn) of less than 22, or 20, or 18, or 16, or 15, or within a range from 5, or 6, or 7, or 7.5, or 8, or 8.5, or 9 to 15, or 16, or 18, or 20, or 22.

In any embodiment, the tPP's have an MFR (2.16 kg/230° C.) within a range from 0.2, or 0.5, or 1 to 4, or 6, or 8, or 10, or 20 g/10 min.

The inventive tPP's have desirable elasticity while in the melt phase. In any embodiment, the Tan Delta (ratio of the ratio of viscous modulus (G") to elastic modulus (G') and a useful quantifier of the presence and extent of elasticity in the melt) of the trimmed polypropylene is greater than 4, or 6, or 8, or 10, or within a range from 4, or 6, or 8, or 10 to 20, or 24, or 28, or 32, or 36.

The inventive tPP's also have advantageous bulk-physical properties. In any embodiment the tPP has a Modulus of greater than 13, or 14, or 15 MPa, or within a range from 13, or 14, or 15 MPa to 18, or 20, or 22, or 24 MPa. Also in any embodiment the Tan Delta (ratio of the ratio of viscous modulus (G") to elastic modulus (G') and a useful quantifier of the presence and extent of elasticity in the melt) of the tPP is greater than 4, or 6, or 8, or 10, or within a range from 4, or 6, or 8, or 10 to 20, or 24, or 28, or 32, or 36. And in any embodiment, as with the base HMS PP, the reaction product of multi-functional monomers (e.g., polyfunctional acrylates) or oligomers (e.g., polyisobutylene), or cross-linking agents (e.g., silanes, siloxanes) are absent from the tPPs.

Films Formed From the Trimmed Polypropylene

Many articles can be formed from the inventive tPP's described herein such as thermoformed articles, blow molded articles, injection molded articles, sheets, fibers, fabrics, and other useful items. But most preferably, the tPP's can be formed in any manner known in the art into films, especially cast films, extrusion coated films, and blown films, and most preferably included as at least part of one or more layers of a multi-layered film. Such types of films may have two, three, four or more layers represented such as S/C, S/C/C, S/T/C/S, S/T/C/T/S, wherein "C" is a core layer, "T" is a tie-layer, and "S" is a skin layer, each of which may be made from the same or different materials. Any one or more layers can comprise the tPP's, or consist essentially of the tPP's, or consist of one or more tPP's. Preferably, structures include those that comprise a layer comprising within a range from 50, or 55, or 60 wt % to 80, or 85, or 90 wt %, by weight of the components of that layer, of one or more tPP's. Most preferably, that layer is a core layer with at least one skin layer comprising a polyethylene and/or polypropylene. Desirably, the tPP's replace the HDPE in many known film structures and allow down-gauging by 10 to 30% relative to when HDPE is used.

Such mono- or multi-layered films have many advantages over other such films, especially those that may otherwise include HDPE as the high modulus component. In any embodiment the invention herein includes a multilayered film comprising at least one layer comprising the trimmed polypropylene wherein the film has a 1% Secant Flexural Modulus (MD or TD) of greater than 80,000 psi (551 MPa), or 100,000 psi (689 MPa), or 140,000 (965 MPa), or 160,000 (1103 MPa) or within a range from 80,000 psi (551 MPa), or 100,000 psi (689 MPa) to 140,000 psi (965 MPa), or 160,000 psi (1103 MPa), or 180,000 psi (1240 MPa), or 190,000 psi (1320 MPa).

The inventive mono- or multi-layered films also have other desirable properties. In any embodiment the films have an Elmendorf Tear (MD or TD) within a range from 50, or 60 g/mil to 90, or 100 g/mil. Also in any embodiment the films have a Dart Drop within a range from 80, or 100, or 120 g/mil to 200, or 220, or 240 g/mil. These properties are maintained or improved relative to their HDPE counterparts.

The inventive tPP's are especially useful in making blown films. In a typical blown film process the ingredients used to form the film are added in any desirable form, preferably as granules, into a hopper which feeds the material to an extruder, where the materials are melt blended at a desirable temperature through shear forces and/or heating. The molten material is then fed, with or without filtering, to a die which may have just one, or have multiple cavities corresponding to each of multiple layers that will form the film. The die is also heated to a desired temperature and then forced from the die in a direction away from the die. The cooling of the forming film takes place via a device that blows air that is at least 5 or 10° C. cooler than the surrounding air, where the "surrounding air" is air that is at least 1 meter from the cooling device, but less than 5 meters. The air preferably blows against the outside of the film, most preferably around the entire circumference formed by the film. There is also air blown internally that both cools and blows the film up like a balloon. The film starts to expand where it eventually cools and crystallizes to form a blown film.

The performance of the compositions comprising the inventive tPP's being formed into a film can be characterized by its Maximum Die Rate. The "Maximum Die Rate" is a normalized extrusion rate by die size which is commonly used in blow film industry. The Maximum Die Rate as used herein is expressed as following: Maximum Die Rate [lb/in-hr]=Extrusion Rate [lb/hr]/Die Circumference [inch]. Another definition of the Maximum Die Rate is expressed as follows: Maximum Die Rate [kg/mm-hr]=Extrusion Rate [kg/hr]/Die Diameter [mm]. The Maximum Die Rate in the present invention at which the film is formed is greater than 13 lb/in-hr (0.73 kg/mm-hr) or 16 lb/in-hr (0.90 kg/mm-hr) or 24 lb/in-hr (1.34 kg/mm-hr) in any embodiment, or within a range from 13 lb/in-hr (0.73 kg/mm-hr) or 16 lb/in-hr (0.90 kg/mm-hr), or 24 lb/in-hr (1.34 kg/mm-hr) to 30 (1.69 kg/mm-hr), or 40 lb/in-hr (2.25 kg/mm-hr). Note that for the "Maximum Die Rate" in the English unit, the die dimension is the die circumference, while in metric units, the die dimension is the die diameter. Thus, for die factor in lb/in-hr, the full expression is lb/die circumference (in unit of inch)/hr; and for die factor in kg/mm-hr, the full expression is kg/die diameter (in unit of mm)/hr.

Desirably, the inventive tPP's can be processed at advantageously low temperatures. In any embodiment, the tPP's can be processed, such as melt extruded, at barrel temperatures of less than 210, or 200, or 190° C., or within a range from 160, or 170° C. to 190, or 200, or 210° C.; and die temperatures of less than 210° C., or within a range from 190, or 200, or 205° C. to 210° C.

In any embodiment, other "additives" may also be present in the films and/or tPP's as is known in the art, in any embodiment up to 1, or 2, or 3 wt % by weight of the inventive compositions. These additives may be added before, during, or after the formation of the inventive coextruded sheets or films. Such additives include antioxidants (e.g., hindered phenol- and phosphite-type compounds), stabilizers such as lactone and vitamin E, nucleators (both α-nucleators and β-nucleators), colorants (dyes, pigments, etc.), fillers (silica, talc, etc.), UV stabilizers, release agents, tackifiers, anti-static agents, acid scavengers (e.g., calcium stearate), anti-blocking agents, anti-blooming agents, and other common additives as is known in the art. Examples of suitable nucleators include sodium benzoate and Hyperform™ HPN 68-L (Milliken). In a preferred embodiment, even when the high melt strength polypropylene or films "consist of" the named components, the composition may nonetheless include up to 4000 ppm of one or more antioxidants, or up to 4000 ppm of each of antioxidants (one or more) and foaming agents (one or more).

In any embodiment, wherein nucleating agents are absent, and preferably, wherein α-nucleating agents are absent, meaning they are not added to the composition or any components of the composition at any stage of the process of formation. Examples of α-nucleating agents include salts of monocarboxylic acids and polycarboxylic acids, sorbitols such as dibenzylidenesorbitol, salts of diesters of phosphoric acid, vinylcycloalkane polymers, and others as is known in the art.

The tPP's described herein are particularly useful in films and articles that include films or film coatings. Films of less than 250 μm average thickness can be made using the tPP's described herein and can comprise any number of layers, such as additional layers of LLDPE, HDPE, LDPE, iPP, EP copolymers, and combinations thereof. Also, the tPP can comprise a composition including any of these polymers or combinations of polymers and be present in any desirable amount. Furthermore, sheets having an average thickness of 250 μm or more can be made using the tPP's described herein, or may comprise one or more layers comprising tPP and another material such as LLDPE, HDPE, LDPE, iPP, EP copolymers, and combinations thereof. Such sheets, or other desirable structures made using the tPP's described herein, may be thermoformed, blow molded, or injection molded into useful articles, and further, tPP's may be rotomolded to form useful articles.

The various descriptive elements and numerical ranges disclosed herein for the inventive tPP and methods of forming the tPP and films therefrom can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

Test Methods

The crystallization and melting point temperatures of HMS PP's, and the tPP's described below, were determined by Differential Scanning calorimetry at 10° C./min on a Pyris™ 1 DSC. The DSC ramp rate is 10° C./min for both heating and cooling. The measurements are taken as follows: 1) Hold for 10.0 min at −20.0° C.; 2) Heat from −20.0° C. to 200.0° C. at 10.0° C./min; 3) Hold for 10.0 min at 200.0° C.; 4) Cool from 200.0° C. to −20.0° C. at 10.0° C./min; 5) Hold for 10.0 min at −20.0° C.; and 6) Heat from −20.0° C. to 200.0° C. at 10.0° C./min.

Polymer molecular weight (weight-average molecular weight, Mw, number-average molecular weight, Mn, and z-averaged molecular weight, Mz) and molecular weight distribution (Mw/Mn) are determined using Size-Exclusion Chromatography (SEC). Equipment consists of a High Temperature Size Exclusion Chromatograph (either from Waters Corporation or Polymer Laboratories), with a differential refractive index detector (DRI) or infrared (IR) detector. In the examples and specification herein, DRI was used, and mono-dispersed polystyrene is the standard with Mark-Howink ("MH") constants of $\alpha=0.6700$, and $K=0.000175$. Three Polymer Laboratories PLgel 10 mm Mixed-B columns are used. The nominal flow rate is 0.5 $cm^3$/min and the nominal injection volume is 300 μL. The various transfer lines, columns and differential refractometer (the DRI detector) are contained in an oven maintained at 135-145° C., and a dissolution temperature of 160° C. Solvent is prepared by dissolving 6 grams of butylated hydroxy toluene as an antioxidant in 4 liters of reagent grade 1,2,4-trichlorobenzene (TCB), the final concentration of polymer is from 0.4 to 0.7 mg/mL. The TCB mixture is then filtered through a 0.7 μm glass pre-filter and subsequently through a 0.1 μm Teflon filter. The TCB is then degassed with an online degasser before entering the column. The MH constants were as follows: $K=0.000579$, $\alpha=0.695$ (DRI); and $K=0.0002290$, $\alpha=0.7050$, (IR). Values for Mn are ±2,000 g/mole, for Mw are ±5,000 g/mole, and Mz are ±50,000 g/mole.

Melt flow properties were measured according to ASTM D1238, 2.16 kg, 230° C.

Secant Flexural Modulus properties were measured according to ASTM D882.

Tensile Properties of the films were measured according to ASTM D882.

Dart Drop properties of the films were measured according to ASTM D1709A.

Elmendorf Tear properties of the films were measured according to ASTM 1922.

The method used to measure the melt strength and elongational viscosity using the Rheotester 1000 capillary rheometer in combination with the Rheotens 71.97 (Gottfert) is described in established test method RHEO4-3.3 ("Measurement of the elongational viscosity of molten polymers"):

A. Test conditions. The conditions for testing melt strength/extensional viscosity using the Rheotens 71-97 in combination with the Rheotester 1000 are described in RHEO4-3.3:

Rheotester 1000:
  Temperature: 190° C.
  Die: 30/2
  Piston speed: 0.278 mm/s
  Shear rate: 40.050 $sec^{-1}$
Strand:
  Length: 100 mm
  Vo: 10 mm/s
Rheotens:
  Gap: 0.7 mm
  Wheels: grooved
  Acceleration: 12.0 $mm/s^2$ B. Testing. For each material, several measurements are performed. In fact, the complete amount of material present in the barrel of the Rheotester was extruded through the die and was being picked up by the rolls of the Rheotens. Once the strand was placed between the rolls, the roll speed was adjusted until a force of "zero" was measured. This beginning speed "Vs" was the speed of the strand through the nip of the wheels at the start of the test. Once the test was started, the speed of the rolls was increased with a 12.0 $mm/s^2$ acceleration and the force was measured for each given speed. After each strand break, or strand slip between the rotors, the measurement was stopped and the material was placed back between the rolls for a new measurement. A new curve was recorded. Measuring continued until all material in the barrel was used.

C. Data treatment. After testing, all the obtained curves are saved. Curves which are out of line are deactivated. The remaining curves, are cut at the same point at break or slip (maximum force measured), and are used for the calculation of a mean curve. The numerical data of these calculated mean curves are reported.

Small amplitude oscillatory shear testing (often referred to as SAOS) provides information concerning the flow behavior of the polymer melts. A small discrete periodic amplitude (stress/strain) is applied to the molten polymer disk between two plates in such a way whereas the torque and phase angle can be measured. From the know input and measured output, specific rheological function can be derived, including the storage modulus, loss modulus, and complex viscosity. Changing the constants and variables within the test will give different results. The SAOS Rheology test used herein was conducted on a ARES-G2 Rheometer (TA Instruments Co. Ltd.). Samples were loaded and tested on 25 mm parallel plates at a gap between 0.5 mm to 2.5 mm depending on the specimen. Strain Sweep: At a fixed/test temperature (190° C.), and at a fixed frequency 1 Hz or 10 Hz (6.28 or 62.8 rad/s), the strain sweep (0.1% to 20%) was performed to determine the critical strain value within the linear viscoelastic region. Dynamic Frequency Sweep: At a fixed/test temperature (190° C.), and at a fixed strain (10%), the angular frequency of oscillation was swept within the determine range (500 rad/s to 0.01 rad/s at 5 pt per decade). This provided specific measurements, including the storage modulus (G'), loss modulus (G"), and complex viscosity (η*). In the data tables, the Cross-over Modulus (Gc)=The frequency where the storage (elastic) G' and loss (viscous) G" moduli are equal (or cross-over).

Sample preparation for small amplitude oscillatory shear (SAOS) test is as follows. The specimen was compression molded from granules on hot press manufacture by LAB Tech Engineering Company Ltd. Granules were compressed at 190° C., 292 N for 8 min after 5 min preheat by using 1 mm thick molds with five 25 mm diameter cavities. Then specimens were water-cooled in 10 min to room temperature (23° C.).

Composition

Figure 2:
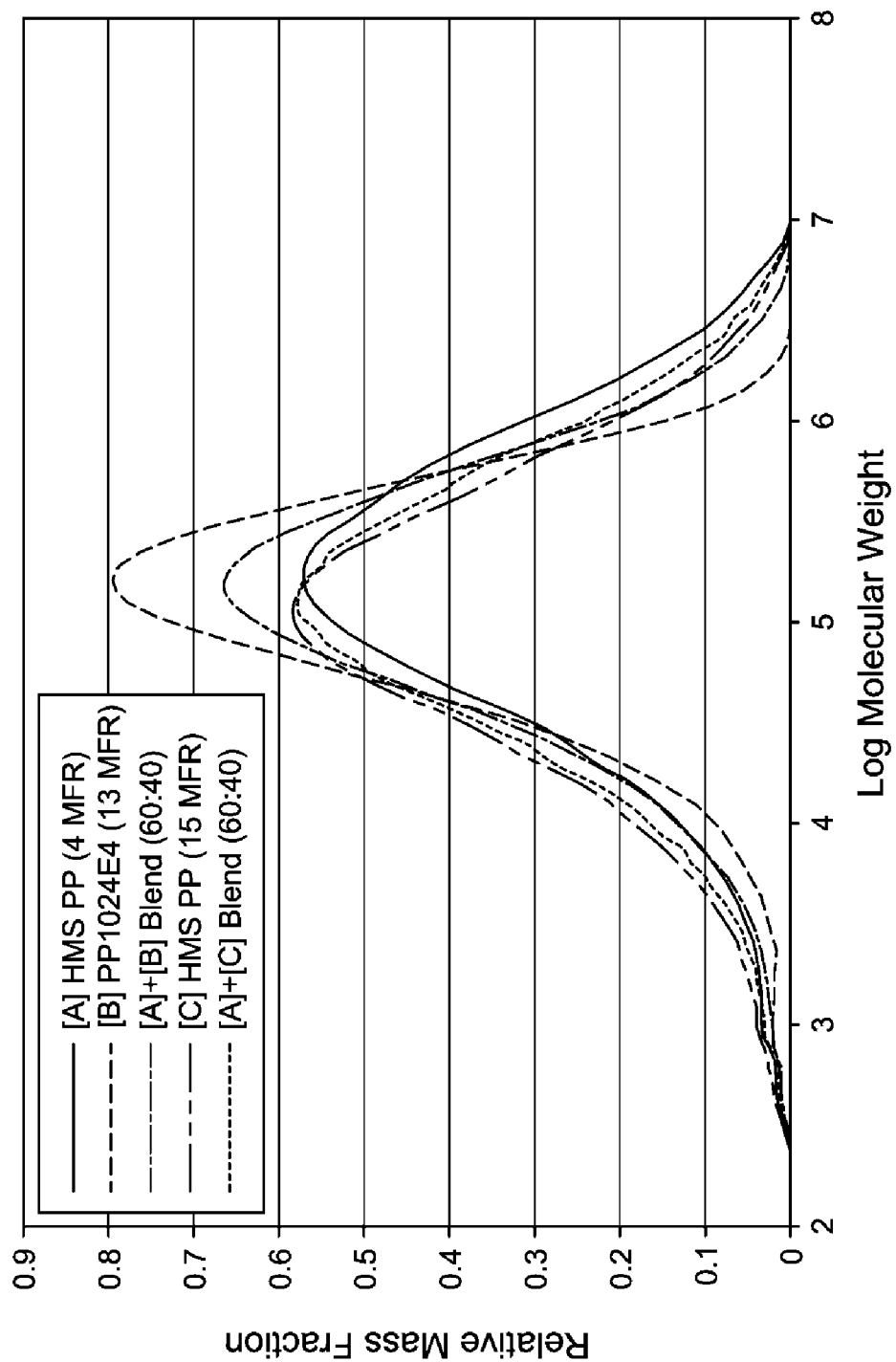
FIG. 2 shows overlay SEC chromatograms of exemplary high melt strength PP that has been "trimmed" using another narrow molecular weight PP to reduce or dilute the high molecular weight tail.

The HMS PP used in the examples that demonstrate trimming with organic peroxide has the properties of the "HMS PP" with no added peroxide as in Tables 1, 2A and 3A; more particularly, the melt flow rate (MFR) was about 1.8 g/10 min, the Mw was about 440,000 g/mole, the Mn was about 25,000 g/mole, and the Mz was about 1,600,000 g/mole (thus, having an Mw/Mn of about 16.9, and Mz/Mw of about 3.7, and an Mz/Mn of about 62), and the melt strength was about 40 cN (190° C.). The branching ($g'_{vis}$) value for the HMS PP was about 1. The HMS PP used in the trimming experiments with the narrow MWD polypropylene were 4 and 15 MFR (g/10 min, 2.16 kg/230° C.) HMS PP samples, the results of which are shown in FIG. 2. The 4 MFR HMS PP had an Mn of 30,940 g/mole, an Mw of 489,529 g/mole, an Mz of 1,925,003 g/mole, and an Mw/Mn of 15.8. The 15 MFR HMS PP had an Mn of 15,201 g/mole, and Mw of 302,425 g/mole, a Mz of 1,537,333 g/mole, and an Mw/Mn of 19.9.

Luperox™ 101 was purchased from Akzo Nobel. The "samples" in the tables were blends of the amount of "peroxide" listed in the table and the HMS PP.

The narrow MWD polypropylene used in trimming HMS PP was ExxonMobil 1024E4 polypropylene homopolymer (13 g/10 min melt flow rate, 2.16 kg/230° C., MWD of 4.1, Mz/Mw of 2.3).

Two sets of experiments were performed, the first in a lab-scale extruder and the second in a commercial size extruder, to demonstrate the trimming of the HMS PP to make the trimmed polypropylene. In the lab-scale extruder, trimming was accomplished by adding the solid peroxide (Luperox, a "long half-life" peroxide), or ExxonMobil 1024E4, to the HMS PP, blending in a tumbler with the additives, and the compounding/extruding the blend in an extruder to make final pellets. The amounts of organic peroxide and narrow MWD polypropylene are as in the Tables, and FIGS. 1 and 2. In the commercial-scale extruder, the trimming was accomplished by adding liquid peroxide mixed with mineral oil, and pumping it to the mouth of the extruder where it comes in contact and reacts with the granules and additives. It was extruded to make pellets. The lab-scale extruder used was a 30 mm Werner Pfleiderer twin screw extruder, and the commercial scale extruder was a 57 mm Werner Pfleiderer twin screw. Barrel temperatures varied with MFR of the polypropylene, but a melt temperature of about 490° F. (254° C.) was targeted. Melt temperature was measured using a thermocouple probe in the melt at least at the exit (die) portion of the extruder. The data in Tables 1, and 2A-2B are derived from the lab-scale extruder, and the data in Tables 3A-3C are derived from the commercial-scale extruder. Comparative commercial polypropylenes from Braskem and Borealis (Daploy™) were also extruded as above and tested as described herein.

Figure 3:
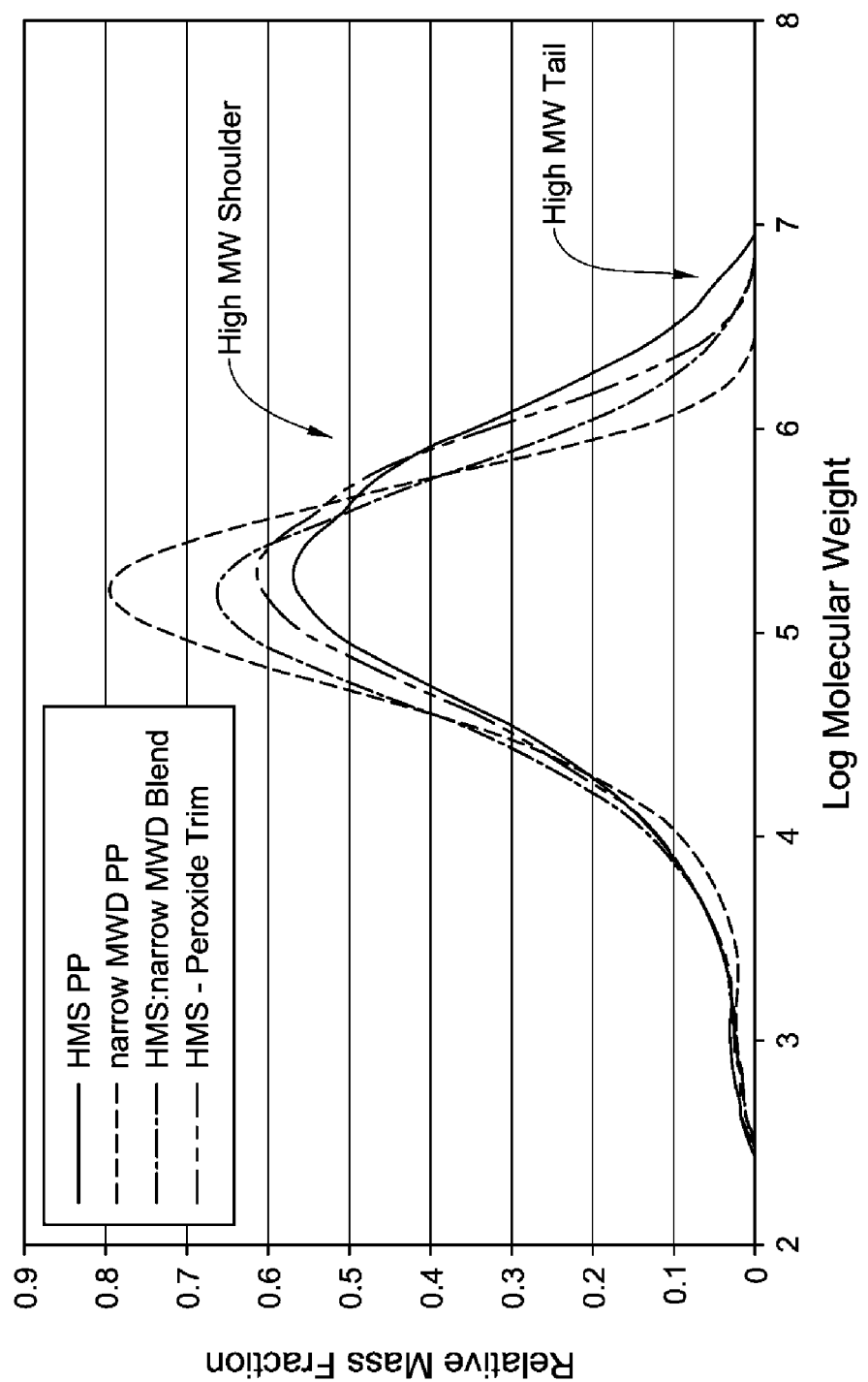
FIG. 3 shows overlay SEC chromatograms of exemplary high melt strength PP comparing the two methods of trimming.

Some of the data are summarized graphically in FIGS. 1 and 2, showing how the high molecular weight tail of the HMS PP is lowered, decreasing the amount of the high molecular weight component and reducing Mz/Mn. FIG. 3 shows a comparison of chromatograms between the two types of trimming, where "narrow MWD PP" is the ExxonMobil 1024E4. It can be seen that a high molecular weight shoulder and tail are lowered by both methods of trimming.

TABLE 1

Effect of treating HMS PP with long half-life peroxide

| Measured parameter | Units | HMS PP Example 1 0 ppm | Long half-life peroxide treated HMS PP | | |
|---|---|---|---|---|---|
| | | | Example 2 40 ppm | Example 3 60 ppm | Example 4 100 ppm |
| MFR | g/10 min | 1.8 | 3.7 | 4.1 | 6.3 |
| Melt Strength | cN | 41.9 | 2.4 | 1.7 | 1.7 |
| DSC $T_c$ | ° C. | 113.2 | 119.9 | 117.5 | 118.0 |

TABLE 2A

Detailed Properties of the trimmed polypropylene, and comparative examples

| Example | MFR | MS (cN) | Mn | Mw | Mw/Mn | Mz | Mz/Mn |
|---|---|---|---|---|---|---|---|
| 1 | 1.8 | 41.9 | 26,711 | 451,040 | 16.9 | 1,665,343 | 62 |
| 2 | 3.7 | 2.4 | 26,971 | 349,627 | 13.0 | 1,079,918 | 40 |
| 3 | 4.1 | 1.7 | 28,031 | 330,364 | 11.8 | 983,956 | 35 |
| 4 | 6.3 | 1.7 | 29,105 | 292,813 | 10.1 | 781,994 | 27 |
| Comparative examples: | | | | | | | |
| Daploy ™ WB140 | 4.2 | 41.2 | 46,117 | 288,243 | 6.3 | 728,637 | 16 |
| Braskem ™ 6022 | 2.3 | 7.5 | 42,426 | 408,725 | 9.6 | 1,116,513 | 26 |

TABLE 2B

Detailed Properties of the trimmed polypropylene, and comparative examples

| | Oscillating Shear Rheology | | | | | |
|---|---|---|---|---|---|---|
| | | Crossover | | | | |
| Example | Tan delta | Modulus (Pa) | Crossover (Rad/Sec) | Tc (° C.) | $Tm_1$ (° C.) | $Tm_2$ (° C.) |
| 1 | 3.6 | 12,259 | 3.6 | 113.2 | 166.3 | 166.3 |
| 2 | 10.4 | 17,109 | 11.8 | 119.9 | 166.5 | 164.0 |
| 3 | 14.0 | 17,834 | 15.5 | 117.5 | 167.6 | 163.6 |
| 4 | 21.5 | 18,365 | 23.7 | 118.0 | 167.8 | 164.3 |
| Comparative examples: | | | | | | |
| Daploy ™ WB140 | 1.9 | 5458 | 6.0 | 126.0 | 161.1 | 159.5 |
| Braskem ™ 6022 | 7.5 | 18,932 | 6.5 | 131.9 | 165.8 | 166.1 |

TABLE 3A

Higher level treatment of HMS PP with long half-life peroxide

| Example # | Description | MFR |
| --- | --- | --- |
| 5 | 0 ppm peroxide | 2.0 |
| 6 | 50 ppm peroxide | 2.3 |
| 7 | 100 ppm peroxide | 2.5 |
| 8 | 150 ppm peroxide | 3.9 |
| 9 | 200 ppm peroxide | 5.4 |
| 10 | 250 ppm peroxide | 6.4 |
| 11 | 300 ppm peroxide | 8.0 |

TABLE 3B

Higher level treatment of HMS PP with long half-life peroxide

| Example # | MFR | MS (cN) | Mn | Mw | Mw/Mn | Mz | Mz/Mn |
| --- | --- | --- | --- | --- | --- | --- | --- |
| 5 | 2.0 | 49.1 | 27,546 | 491,680 | 17.85 | 1,751,643 | 64 |
| 6 | 2.3 | 10.9 | 22,068 | 430,637 | 19.51 | 1,605,641 | 73 |
| 7 | 2.5 | 4.4 | 25,719 | 398,097 | 15.48 | 1,311,270 | 51 |
| 8 | 3.9 | 4.2 | 24,274 | 352,557 | 14.52 | 1,145,943 | 47 |
| 9 | 5.4 | 2.6 | 23,765 | 307,734 | 12.95 | 878,282 | 37 |
| 10 | 6.4 | 2.9 | 22,013 | 284,891 | 12.94 | 785,879 | 36 |
| 11 | 8.0 | 2.1 | 23,412 | 268,379 | 11.46 | 721,149 | 31 |

TABLE 3C

Higher level treatment of HMS PP with long half-life peroxide

Oscillating Shear Rheology

| Example # | Tan Delta | Crossover Modulus (Pa) | Crossover (Rad/Sec) | Tc (° C.) | $Tm_1$ (° C.) | $Tm_2$ (° C.) |
| --- | --- | --- | --- | --- | --- | --- |
| 5 | 3.3 | 12,687 | 2.3 | 123.5 | 167.1 | 164.6 |
| 6 | 4.2 | 13,150 | 4.6 | 123.8 | 167.0 | 165.0 |
| 7 | 5.7 | 14,131 | 6.0 | 123.2 | 166.3 | 164.8 |
| 8 | 12.4 | 16,897 | 12.2 | 123.2 | 168.0 | 165.1 |
| 9 | 24.5 | 19,245 | 20.7 | 122.7 | 168.0 | 164.6 |
| 10 | 44.4 | 20,261 | 27.9 | 122.8 | 166.6 | 164.6 |
| 11 | 35.4 | 20,863 | 35.1 | 122.8 | 166.5 | 164.1 |

Films

Three-layer films were fabricated on an Alpine Blown film line. The resins were fed to the extruder, where they are melted in the screw and extruded through the die. Each film layer has an extruder associated therewith. The melt was then blown to form the bubble, and the samples collected. Each melt was co-extruded together to form multi-layer film.

When forming the layer comprising the HMS-PP (core layer), the target melt temperature was 225° C., and the target barrel temperatures (seven barrels) were as follows (from feed to die): 210, 240, 220, 220, 220, 220, and 220° C. Either through cooling of extruder barrels and/or removal of filter packs and screen packs, the temperature of the melt that included the HMS PP was kept below 260° C., preferably between 230 and 260° C. The extruder was fitted with a film die having a 60 mil die gap, 250 mm die diameter, and a blow up ratio 2.5. The target throughput was 15 lb/hr/in. The target film gauge ranged from 3.2-3.6 mil. The compositions of the two skin layers and the core layer are as in Tables 4A and 4B. The core layers comprised HMS PP that had been treated with 40 ppm of peroxide as in Tables 1 and 2A, 2B above, or the 3.7 MFR sample ("trimmed PP", or "tPP" in Table 4A and 4B). The percentages in Tables 4A and 4B are weight percentages, by weight of all the polymer components in the film layer.

Vistamaxx™ 3980FL performance polymer is an 8 MFR (2.16 kg/230° C., ASTM 1238) propylene-based elastomer having 9 wt % ethylene-derived units (the remainder propylene-derived units) and a Flexural Modulus of 110 MPa (ASTM D790).

Exceed™ 1018 (HA) is a 1 MI (2.16 kg/190° C.) linear low density polyethylene (ethylene-hexene copolymer) having a density of 0.918 g/cm³ and a peak melting temperature of 119° C., and a Flexural Modulus (MD) of 190 MPa (ASTM D882).

Enable™ 20-05HH is a 0.5 MI (2.16 kg/190° C.) branched linear low density polyethylene (ethylene-hexene copolymer) having a density of 0.920 g/cm³ and a peak melting temperature of 114° C., and a Flexural Modulus (MD) of 210 MPa (ASTM D882).

ExxonMobil HD7845.30 is a 0.45 MI (2.16 kg/190° C.) high density polyethylene having a density of 0.958 g/cm³, and a high load melt index (21.6 kg/190° C.) of 30 g/10 min, and a Flexural Modulus (MD) of 1100 MPa (ASTM D882).

Use of the inventive trimmed polypropylene showed improved properties when incorporated into multi-layered films. There was a distinct improvement in stiffness (1% secant) while still meeting targets for Dart and Tear, as shown in Tables 4A and 4B. However, it was found that during the blown film process that HMS PP alone showed a film surface/bulk irregularity, such as melt fracture, at unusually low shear rates (below a commercial rate range of 13 lb/hr/in) despite good shear thinning and adequate melt strength. By diluting the concentration of high molecular weight chains in HMS PP by blending HMS PP with narrow MWD homopolymer PP, it was found that the film quality improved without the appearance of the film surface/bulk irregularity at commercial rates of greater than 13 lb/hr/in. It was also found that the concentration of high molecular weight tail could be reduced by addition of low levels of peroxides that cause beta scission, that is, those with a long half-life such as Luperox 101 or Triginox 101. Using this approach, the film quality of HMS PP improved without surface and/or bulk irregularity at the commercial rates of 13 or 16 lb/hr/in and above.

TABLE 4A

Films incorporating layers comprising HMS PP treated with long half-life peroxide

| | Core | | | | | |
|---|---|---|---|---|---|---|
| | 67% HD7845.30, 33% Exceed 1018 | 80% tPP + 20% Exceed 1018 | 55% tPP + 45% Exceed 1018 | 80% tPP + 20% Exceed 1018 | 100% tPP | 70% tPP + 20% Exceed 1018 + 10% Vistamaxx 3980FL |
| | Skin | | | | | |
| Skin/Core/Skin thickness Ratio | 75% Exceed 1018, 25% Enable 20-05HH 1/2/1 | 75% Exceed 1018, 25% Enable 20-05HH 1/2/1 | 75% Exceed 1018, 25% Enable 20-05HH 1/2/1 | 75% Exceed 1018, 25% Enable 27-05HH 1/2/1 | 75% Exceed 1018, 25% Enable 20-05HH 1/2/1 | 75% Exceed 1018, 25% Enable 20-05HH 1/2/1 |
| Gauge Mic (mils) | | | | | | |
| Average | 4.29 | 3.55 | 3.51 | 3.50 | 3.54 | 3.53 |
| Low | 4.02 | 3.22 | 3.35 | 3.28 | 3.41 | 3.34 |
| High | 4.67 | 3.96 | 3.70 | 3.60 | 3.68 | 3.66 |
| 1% Secant (psi) | | | | | | |
| MD | 62,019 | 112,106 | 88,656 | 117,155 | 96,971 | 91,089 |
| TD | 67,561 | 105,235 | 86,734 | 107,755 | 95,850 | 88,422 |
| Tensile Yield Strength (psi) | | | | | | |
| MD | 1,976 | 2,933 | 2,631 | 3,085 | 2,731 | 2,699 |
| TD | 2,257 | 2,983 | 2,620 | 3,107 | 2,667 | 2,721 |
| Elongation @ Yield (%) | | | | | | |
| MD | 5.5 | 5.8 | 5.9 | 5.8 | 6.4 | 6.0 |
| TD | 6.1 | 5.9 | 5.8 | 6.3 | 5.7 | 5.9 |
| Tensile Strength (psi) | | | | | | |
| MD | 5,368 | 7,162 | 7,082 | 7,159 | 6,728 | 7,175 |
| TD | 5,558 | 7,159 | 6,933 | 7,065 | 6,659 | 7,043 |
| Elongation @ Break (%) | | | | | | |
| MD | 835 | 877 | 743 | 781 | 731 | 818 |
| TD | 852 | 778 | 731 | 791 | 771 | 783 |

TABLE 4B

Films incorporating layers comprising HMS PP treated with long half-life peroxide

| | Core | | | | | |
|---|---|---|---|---|---|---|
| | 67% HD7845.30, 33% Exceed 1018 | 80% tPP + 20% Exceed 1018 | 55% tPP + 45% Exceed 1018 | 80% tPP + 20% Exceed 1018 | 100% tPP | 70% tPP + 20% Exceed 1018HA + 10% Vistamaxx 3980FL |
| | Skin | | | | | |
| | 75% Exceed 1018, 25% Enable 20-05HH | 75% Exceed 1018, 25% Enable 20-05HH | 75% Exceed 1018, 25% Enable 20-05HH | 75% Exceed 1018, 25% Enable 27-05HH | 75% Exceed 1018, 25% Enable 20-05HH | 75% Exceed 1018, 25% Enable 20-05HH |
| Elmendorf Tear | | | | | | |
| MD (g) | 1045 | 188 | 596 | 168 | 318 | 277 |
| TD (g) | 1643 | 320 | 1141 | 298 | 566 | 554 |
| MD (g/mil) | 248 | 56 | 164 | 49 | 94 | 79 |
| TD (g/mil) | 391 | 93 | 324 | 86 | 159 | 158 |
| Dart Drop Phenolic, Method A | | | | | | |
| (g) | 638 | 542 | 566 | 458 | 320 | 572 |
| (g/mil) | 149 | 153 | 161 | 131 | 90 | 162 |

A second set of blown monolayer films (approx. 48-52 μm average thickness) were produced using a different film line, and comparing to commercial resins. As shown in Table 5, Samples A and B correspond to, respectively, ExxonMobil HD7845 HDPE (ExxonMobil) having a density of 0.958 g/cm$^3$, and a melt index (ASTM D1238, 2.16 kg, 190° C.) of 0.45 g/10 min; and Inspire™ D144 (Braskem) having an MFR of 0.5 g/10 min, and a $T_m$ of 164° C. An HMS PP (propylene homopolymer) having and MFR of 2.3 g/10 min and an Mw/Mn of 18 and an Mz of about 2,500,000 g/mole was treated with a 40 ppm peroxide (Trigonox™ 101) to form a tPP which was then used to make the films of Sample C. The tPP had an MFR of 3.7 g/10 min, an Mw/Mn of 13, an Mn of 31,968 g/mole, an Mw of 415,830 g/mole, and an Mz of 1,823,580 g/mole. The peroxide was added in a continuous process with positive displacement pumps to deliver the peroxide to the extruder feed throat using an injection nozzle, controlled at a rate to achieve the desired MFR.

The films made using the tPP were all run on an Alpine blown film line, 2 mil monolayer film, 2.5 BUR, 60 mil die gap, 15 lbs/hr/in-die using a 65 mm diameter grooved extruder with a 30:1 L/D. The following are temperature conditions in each barrel of the extruder for each example in Table 5:

Sample A conditions: Processing temperatures were 183/192/192/192/192/192/203° C., die temperature at 208° C.;
Sample B conditions: Processing temperatures were 214/244/225/225/225/225/225° C., die temperature at 228° C.; and
Sample C conditions: Processing temperatures for the different zones were 214/244/225/225/225/225/225° C., die temperature at 228° C.

TABLE 5

Inventive and Comparative Monolayer Film Results

| Sample | A<br>Commercial<br>HDPE<br>(ExxonMobil<br>HD7845) | B<br>Commercial<br>PP<br>(Braskem<br>Inspire™ D114) | C<br>tPP |
|---|---|---|---|
| Gauge Mic (mils) | | | |
| Average | 2.02 | 2.07 | 1.99 |
| Low | 1.93 | 1.81 | 1.85 |
| High | 2.14 | 2.27 | 2.14 |
| 1% Secant (psi) | | | |
| MD | 144,600 | 156,396 | 188,883 |
| TD | 186,477 | 129,885 | 178,917 |
| Tensile<br>Yield Strength (psi) | | | |
| MD | 4,504 | 3,908 | 4,887 |
| TD | 5,072 | 3,221 | 4,501 |
| Elongation @ Yield (%) | | | |
| MD | 6.7 | 5.7 | 5.7 |
| TD | 5.7 | 6.3 | 6.0 |
| Tensile Strength (psi) | | | |
| MD | 8,184 | 5,320 | 5,304 |
| TD | 5,584 | 4,430 | 4,936 |
| Elongation @ Break (%) | | | |
| MD | 631 | 419 | 334 |
| TD | 8 | 604 | 8 |
| Elmendorf Tear | | | |
| MD (g) | 24 | 14 | 10 |
| TD (g) | 1819 | 32 | 28 |

It can be seen that the inventive films made using the tPP have a higher stiffness (secant modulus) than the comparative HDPE or the commercial PP film, formed under similar conditions. The tensile and tear properties are comparable, and the inventive tPP can be processed at lower temperatures, desirably, less than 210, or 200, or 190° C. barrel temperatures, and less than 210° C. die temperature.

Now, having described the various features of the inventive tPP's, the method of making them, and films therefrom, disclosed here in numbered embodiments are:

P1. A polypropylene comprising (or consisting essentially of, or consisting of) at least 50 mol % propylene and having a molecular weight distribution (Mw/Mn) of less than 22, or 20, or 18, or 16, or 15, or within a range from 7, or 7.5, or 8, or 8.5, or 9 to 15, or 16, or 18; or 20, or 22, a z-average molecular weight of less than 2,500,000 g/mole, or 2,000,000 g/mole, or 1,600,000 g/mole, or 1,400,000 g/mole, or 1,200,000 g/mole, or within a range from 500,000, or 600,000, or 800,000 g/mole to 1,200,000, or 1,400,000, or 1,600,000 g/mole; a branching index (g'$_{vis}$) of at least 0.95, or 0.97, or 0.98; and a melt strength less than 20, or 15 cN determined using an extensional rheometer at 190° C.

P2. The polypropylene of numbered paragraph 1, wherein the melt strength (190° C.) of the trimmed polypropylene is within a range from 1, or 2 cN to 4, or 6, or 10, or 15, or 20 cN.

P3. The polypropylene of numbered paragraphs 1 or 2, wherein the crystallization temperature Tc of the trimmed polypropylene is greater than 114, or 115, or 116° C.; or within a range from 114, or 115, or 116° C. to 120, or 122 or 124° C.

P4. The polypropylene of any one of the previous numbered paragraphs, wherein the second peak melting temperature (Tm$_2$) of the trimmed polypropylene is greater than 157, or 158, or 159° C., or within a range from 157, or 158, or 159° C. to 166, or 167, or 168, or 169° C.

P5. The polypropylene of any one of the previous numbered paragraphs, wherein the Mz/Mn value of the trimmed polypropylene is less than 60, or 55, or 40, or within a range from 10, or 15, or 20, or 25 to 35, or 40, or 55, or 60.

P6. The polypropylene of any one of the previous numbered paragraphs, wherein the Mz/Mw value of the trimmed polypropylene is less than 4.0, or 3.8, or 3.6, or within a range from 2.5, or 2.6 to 3.6, or 3.8, or 4.0.

P7. The polypropylene of any one of the previous numbered paragraphs, wherein the reaction product of multi-functional monomers or oligomers, or cross-linking agents are absent.

P8. The polypropylene of any one of the previous numbered paragraphs, wherein the Tan Delta (ratio of the ratio of viscous modulus (G") to elastic modulus (G') and a useful quantifier of the presence and extent of elasticity in the melt) of the trimmed polypropylene is greater than 4, or 6, or 8, or 10, or within a range from 4, or 6, or 8, or 10 to 20, or 24, or 28, or 32, or 36.

P9. A film comprising at least one layer comprising a trimmed polypropylene of any one of the previous numbered paragraphs.

P10. A monolayer or multilayered film comprising at least one layer comprising the trimmed polypropylene of any one of the previous numbered paragraphs, wherein the film has an 1% Secant Flexural Modulus (MD or TD) of greater than 80,000 psi (551 MPa), or 100,000 psi (689 MPa), or within a range from 80,000 psi (551 MPa), or 100,000 psi (689 MPa) to 140,000 psi (965 MPa), or 160,000 psi (1102 MPa), or 180,000 psi (1240 MPa).

P11. The film of numbered paragraph 10, wherein the film has an Elmendorf Tear (MD or TD) within a range from 50, or 60 g/mil to 90, or 100 g/mil.

P12. The film of numbered paragraphs 10 to 11, wherein the film has a Dart Drop within a range from 80, or 100, or 120 g/mil to 200, or 220, or 240 g/mil.

P13. A process to prepare the polypropylene of any one of the previous numbered paragraphs 1 to 8 comprising (or consisting essentially of) combining a high melt strength polypropylene comprising at least 50 mol % propylene, and having a molecular weight distribution (Mw/Mn) greater than 6, a branching index ($g'_{vis}$) of at least 0.95, and a melt strength of at least 20 cN determined using an extensional rheometer at 190° C., with (i) within the range from 20 to 1000 ppm of a long half-life organic peroxide; and/or (ii) within the range from 20 to 70 wt %, by weight of the combined components, of a narrow MWD polypropylene comprising at least 50 mol % propylene, and having a molecular weight distribution (Mw/Mn) of less than 6; isolating a trimmed polypropylene.

P14. The process of numbered paragraph 13, wherein the combining of the high melt strength polypropylene and the long half-life organic peroxide takes place at a temperature within the range from 120 to 300° C.

P15. The process of any one of numbered paragraphs 13-14, wherein the long half-life organic peroxide has a 1 hour half-life temperature ($^1t_{1/2}$) of greater than 100, or 110° C. (in C6 to C26 alkanes or halogenated benzene).

P16. The process of any one of numbered paragraphs 13-15, wherein the melt flow rate (230° C./2.16 kg) of the narrow MWD polypropylene is within a range from 4, or 8 g/10 min to 40, or 60, or 80, or 100 g/10 min.

P17. The process of any one of numbered paragraphs 13-16, wherein the melt flow rate (230° C./2.16 kg) of the high melt strength polypropylene is within a range from 0.5 g/10 min to 10, or 15, or 20 or 40 g/10 min.

P18. The process of any one of numbered paragraphs 13-17, wherein the melt strength (190° C.) of the trimmed polypropylene is within a range from 1, or 2 cN to 4, or 6, or 10, or 16, or 20 cN.

P19. The process of any one of numbered paragraphs 13-18, wherein the crystallization temperature Tc of the trimmed polypropylene is greater than 114, or 115, or 116° C.; or within a range from 114, or 115, or 116° C. to 120, or 122, or 124° C.

P20. The process of any one of numbered paragraphs 13-19, wherein the z-average molecular weight of the trimmed polypropylene is less than 1,600,000 g/mole, or 1,400,000 g/mole, or 1,200,000 g/mole, or within a range from 500,000, or 600,000, or 800,000 g/mole to 1,200,000, or 1,400,000, or 1,600,000 g/mole.

P21. The process of any one of numbered paragraphs 13-20, wherein the Mz/Mn value of the trimmed polypropylene is less than 60, or 55, or 40, or within a range from 10, or 15, or 20, or 25 to 35, or 40, or 55, or 60 (the Mz/Mn of the high melt strength polypropylene is greater than 35, or 40, or 55, or 60).

P22. The process of any one of numbered paragraphs 13-21, wherein the Mz/Mw value of the trimmed polypropylene is less than 4.0, or 3.8, or 3.6, or within a range from 2.5, or 2.6 to 3.6, or 3.8, or 4.0 (the Mz/Mw of the high melt strength polypropylene is greater than 3.0, or 3.4, or 3.6).

P23. The process of any one of numbered paragraphs 13-22, wherein the trimmed polypropylene has a Modulus of greater than 13, or 14, or 15 MPa, or within a range from 13, or 14, or 15 MPa to 18, or 20, or 22, or 24 MPa.

P24. The process of any one of numbered paragraphs 13-23, wherein multi-functional monomers or oligomers, and cross-linking agents are absent.

P25. The process of any one of numbered paragraphs 13-24, comprising extruding the trimmed polypropylene though a film die to produce a film or coating (cast, blown or extrusion coating).

P26. The process of any one of numbered paragraphs 13-25, wherein film is produced at a rate within the range from 6, or 10, or 12, or 15 to 20, or 24, or 26 lb/hr/in.

P27. The process of any one of numbered paragraphs 13-26, wherein the Mz of the high melt strength polypropylene is within a range from 1,850,000, or 2,000,000, or 2,500,000 g/mole to 3,000,000 g/mole, and the Mz of the isolated polypropylene is within a range from 600,000, or 800,000, or 1,000,000 g/mole to 1,800,000 g/mole.

P27. The polypropylene or process of any one of the previous claims, wherein nucleating agents are absent, and preferably, wherein α-nucleating agents are absent.

Also disclosed in any embodiment is the use of a long half-life organic peroxide to trim the HMS PP to form the tPP as described herein.

Also disclosed in any embodiment is the use of the tPP to form a film as described herein.

The phrase "consisting essentially of" with reference to a composition means that the composition may include "additives" as described herein, if at all, to no more than 3 wt %, or 2 wt %, or 1 wt % based on the weight of the composition and one or more additives, but no other polymeric components. The phrase "consisting essentially of" with reference to a process means that there are no other additives other than those named present in the compositions other than "additives" as described herein, nor any chemical transformative process steps (steps that will alter chemical bonds in the tPP) not named. In any embodiment, even when the composition and/or process "consists essentially of" the named components and potential "additives," compounds such as multi-functional monomers (e.g., polyfunctional acrylates) or oligomers (e.g., polyisobutylene), or cross-linking agents (e.g., silanes, siloxanes) are absent from the tPPs and/or films therefrom.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A polypropylene comprising at least 50 mol % propylene and having a molecular weight distribution (Mw/Mn) within a range of from 7 to 22, a z-average molecular weight of less than 2,500,000 g/mole, a branching index ($g'_{vis}$) of at least 0.95; wherein the melt strength using an extensional rheometer at 190° C. of the polypropylene is within a range from 1 cN to 15 cN.

2. The polypropylene of claim 1, wherein the crystallization temperature Tc of the polypropylene is greater than 114° C.

3. The polypropylene of claim 1, wherein the second peak melting temperature ($Tm_2$) of the polypropylene is greater than 157° C.

4. The polypropylene of claim 1, wherein the Mz/Mn value of the polypropylene is less than 60.

5. The polypropylene of claim 1, wherein the Mz/Mw value of the polypropylene is less than 4.0.

6. The polypropylene of claim 1, wherein the reaction product of multi-functional monomers or oligomers, or cross-linking agents are absent.

7. The polypropylene of claim 1, wherein the Tan Delta of the polypropylene is greater than 4.

8. The polypropylene of claim 1, wherein nucleating agents are absent.

9. A film comprising at least one layer comprising a polypropylene of claim 1.

10. The film of claim 9, wherein the film has a 1% Secant Flexural Modulus in the MD or TD of greater than 80,000 psi.

11. The film of claim 9, wherein the film has an Elmendorf Tear in the MD or TD within a range from 50 g/mil to 100 g/mil.

12. The film of claim 9, wherein the film has a Dart Drop within a range from 80 g/mil to 240 g/mil.

* * * * *